United States Patent
Hu et al.

(10) Patent No.: US 11,586,006 B2
(45) Date of Patent: Feb. 21, 2023

(54) REFLECTIVE ELEMENT DRIVING MODULE

(71) Applicant: TDK TAIWAN CORP., Taoyuan (TW)

(72) Inventors: Chao-Chang Hu, Taoyuan (TW); Che-Wei Chang, Taoyuan (TW); Chih-Wen Chiang, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 476 days.

(21) Appl. No.: 16/727,448

(22) Filed: Dec. 26, 2019

(65) Prior Publication Data
US 2020/0209521 A1    Jul. 2, 2020

Related U.S. Application Data

(60) Provisional application No. 62/785,593, filed on Dec. 27, 2018.

(30) Foreign Application Priority Data

Dec. 20, 2019   (EP) .................................... 19218902

(51) Int. Cl.
*G02B 7/09*    (2021.01)
*G02B 27/64*   (2006.01)
(Continued)

(52) U.S. Cl.
CPC ................. *G02B 7/09* (2013.01); *G02B 3/12* (2013.01); *G02B 7/023* (2013.01); *G02B 7/1828* (2013.01);
(Continued)

(58) Field of Classification Search
CPC ...... G02B 7/09; G02B 7/1828; G02B 26/004; G02B 27/646; G02B 3/12; G02B 7/023; G03B 5/00; G03B 13/36; G03B 2205/0007; G03B 2205/0069; H04N 5/52257; H04N 5/23287; H04N 5/23258
See application file for complete search history.

(56) References Cited

U.S. PATENT DOCUMENTS

2010/0232161 A1* 9/2010 Aschwanden ........... G02B 3/14
                                                               359/666
2013/0039640 A1* 2/2013 Sekimoto ................. G03B 5/02
                                                               396/55
(Continued)

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

A reflective element driving module includes a first reflective element, a second reflective element, and a driving assembly. The first reflective element has a first reflective surface, disposed to correspond to the incident light, wherein the light has an optical axis. The second reflective element has a second reflective surface, disposed to correspond to the light reflected by the first reflective element, and is movable relative to the first reflective element. The driving assembly is configured to drive the second reflective element to move relative to the first reflective element, wherein the first reflective surface and the second reflective surface face different directions.

20 Claims, 6 Drawing Sheets

(51) Int. Cl.
*G03B 5/00* (2021.01)
*G03B 13/36* (2021.01)
*G02B 3/12* (2006.01)
*G02B 26/00* (2006.01)
*G02B 7/182* (2021.01)
*G02B 7/02* (2021.01)
*H04N 5/225* (2006.01)
*H04N 5/232* (2006.01)
*G03B 5/02* (2021.01)
*G03B 3/10* (2021.01)

(52) U.S. Cl.
CPC ......... *G02B 26/004* (2013.01); *G02B 27/646* (2013.01); *G03B 3/10* (2013.01); *G03B 5/00* (2013.01); *G03B 5/02* (2013.01); *G03B 13/36* (2013.01); *H04N 5/2257* (2013.01); *H04N 5/23258* (2013.01); *H04N 5/23287* (2013.01); *G03B 2205/0007* (2013.01); *G03B 2205/0015* (2013.01); *G03B 2205/0069* (2013.01)

(56) References Cited

U.S. PATENT DOCUMENTS

| | | | |
|---|---|---|---|
| 2013/0223699 A1* | 8/2013 | Nagashima | G06V 40/16 382/118 |
| 2018/0306406 A1* | 10/2018 | Kang | F21V 5/04 |
| 2018/0329173 A1* | 11/2018 | Hu | G02B 27/646 |
| 2018/0335602 A1* | 11/2018 | Hu | G02B 7/04 |
| 2019/0104239 A1* | 4/2019 | Aschwanden | H04N 5/2254 |
| 2019/0353982 A1* | 11/2019 | Hu | F03G 7/0614 |
| 2020/0036897 A1* | 1/2020 | Kuo | H04N 5/23258 |
| 2020/0264445 A1* | 8/2020 | Chen | G03B 21/145 |

* cited by examiner

REFLECTIVE ELEMENT DRIVING MODULE

CROSS-REFERENCE TO RELATED APPLICATIONS

The present application claims priority to U.S. Provisional Patent Application No. 62/785,593, filed Dec. 27, 2018, and European Patent Applications No. 19218902.5, filed on Dec. 20, 2019, which are incorporated by reference herein in their entirety.

BACKGROUND OF THE DISCLOSURE

Field of the Disclosure

The present invention relates to a driving module, and more particularly to a reflective element driving module.

Description of the Related Art

The design of today's electronic devices is continually moving toward miniaturization, so that various elements or structures of optical modules used in such applications as imaging must be continuously reduced in size to achieve miniaturization. However, in the process of miniaturization, for example, when it is necessary to set a lens with a longer focal length in one of the electronic devices mentioned above, it will cause an increase in the thickness of the electronic devices, which is not conducive to the thinning of the electronic device.

Therefore, how to design a telephoto lens with large amount of light and maintain the thinning of the electronic device has become an important issue.

BRIEF SUMMARY OF THE DISCLOSURE

An embodiment of the invention provides a reflective element driving module that includes a first reflective element, a second reflective element, and a driving assembly. The first reflective element has a first reflective surface disposed to correspond to the incident light, wherein the light has an optical axis. The second reflective element has a second reflective surface disposed to correspond to the light reflected by the first reflective element, and is movable relative to the first reflective element. The driving assembly is configured to drive the second reflective element to move relative to the first reflective element, wherein the first reflective surface and the second reflective surface face different directions.

According to some embodiments of the present disclosure, the first reflective element has a perforation, when viewed in a direction parallel to the optical axis, the perforation partially overlaps the second reflective element, and the perforation is surrounded by the first reflective surface. The reflective element driving module further includes an optical element disposed in the perforation to correspond to the light reflected by the second reflective element, wherein a diameter of the perforation is greater than a width of the optical element. When viewed in a direction perpendicular to the optical axis, the optical element partially protrudes from the perforation. The optical element has an optical element sidewall, and the optical element sidewall has a reduction portion in a direction toward the second reflective element, wherein when viewed in a direction perpendicular to the optical axis, the first reflective element and the optical element at least partially overlap. When viewed in a direction perpendicular to the optical axis, the optical element and the driving assembly at least partially overlap. The reflective element driving module further includes an optical element driving assembly, driving the optical element to move relative to the first reflective element.

According to some embodiments of the present disclosure, the first reflective element has a first reflective element sidewall disposed around the first reflective surface, and the first reflective element sidewall extends along a direction parallel to the optical axis, wherein the first reflective element and the second reflective element are arranged along a direction parallel to the optical axis, and the second reflective element has a transparent material which can allow the light to partially pass through. The reflective element driving module further includes a holder and a bracket, wherein the bracket is connected to the holder and the second reflective element. When viewed along a direction parallel to the optical axis, the bracket partially overlaps the first reflective element. The bracket has a light-transmissive material. The bracket has a plurality of cantilevers, when viewed along a direction parallel to the optical axis, the cantilevers are point-symmetric with the optical axis as a center.

According to some embodiments of the present disclosure, when viewed along a direction parallel to the optical axis, the first reflective surface of the first reflective element partially overlaps the second reflective surface of the second reflective element. When viewed along a direction perpendicular to the optical axis, the driving assembly and the first reflective element at least partially overlap. The reflective element driving module has a rectangular structure with a height of less than 10 cm. The driving assembly drives the second reflective element to move in a direction parallel to the optical axis. The driving assembly drives the second reflective element to move in a direction perpendicular to the optical axis.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

The making and using of the embodiments of an optical module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
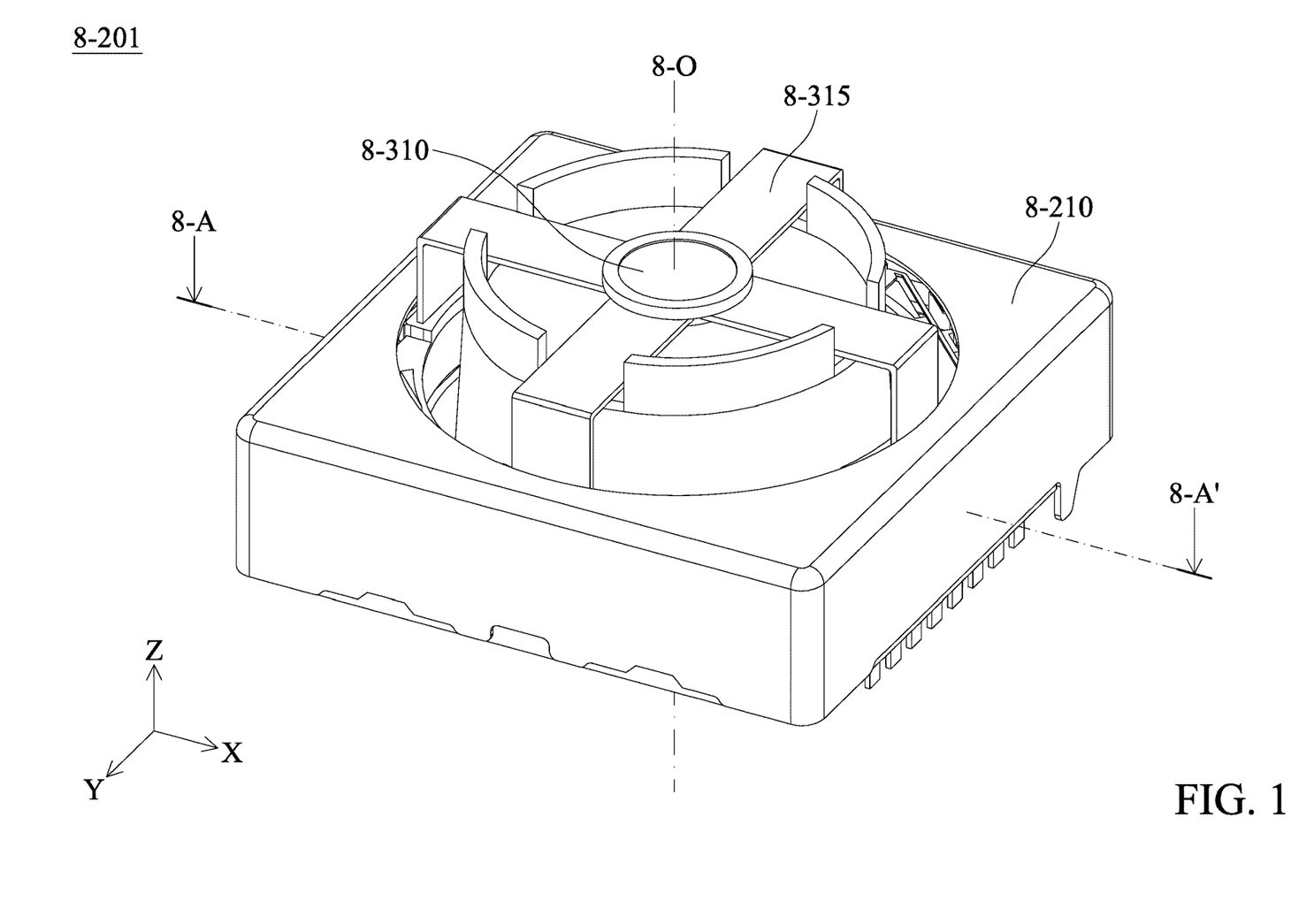
FIG. 1 shows a perspective view of a reflective element driving module in accordance with an embodiment of this disclosure.
Figure 2:
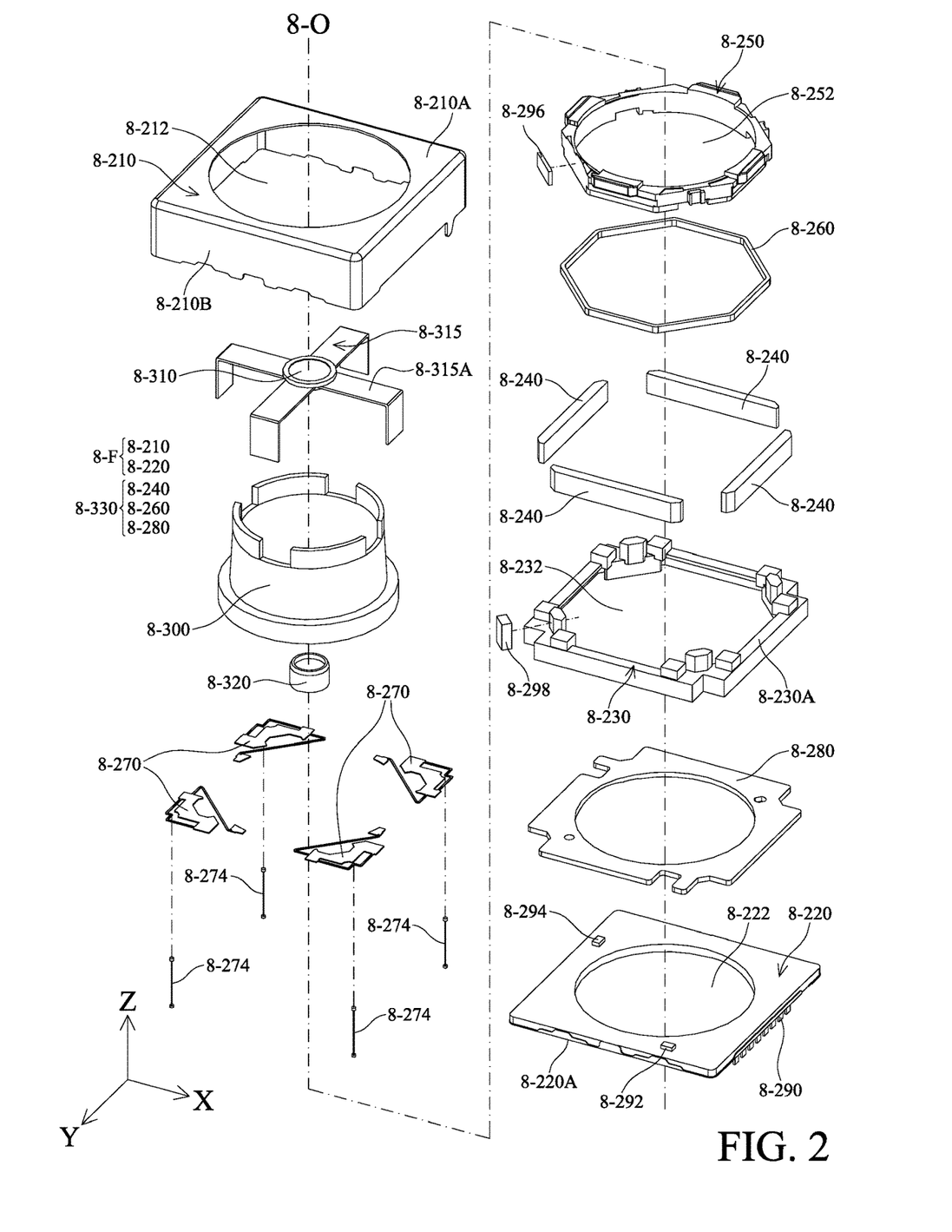
FIG. 2 shows an exploded view of a reflective element driving module in accordance with an embodiment of this disclosure.

Refer to FIG. 1 and FIG. 2. FIG. 1 shows a perspective view of a reflective element driving module 8-201 in accordance with an embodiment of this disclosure, and FIG. 2 shows an exploded view of the reflective element driving module 8-201 in accordance with an embodiment of FIG. 1 of this disclosure. As shown in FIG. 1 and FIG. 2, in the present embodiment, the reflective element driving module 8-201 has a rectangular structure with a height of less than 10 cm, and mainly includes a top case 8-210, a base 8-220, a frame 8-230, four magnets 8-240, a holder 8-250, a coil 8-260, an elastic element 8-270, four suspension wires 8-274, a driving board 8-280, a circuit board 8-290, a first magnetic field sensing element 8-292, and a second magnetic field sensing element 8-294, a third magnetic field sensing element 8-296, a first reflective element 8-300, a second reflective element 8-310, a bracket 8-315, and an optical element 8-320. The reflective element driving module 8-201 reflects an incident light having an optical axis 8-O through the first reflective element 8-300 and the second reflective element 200 inside the reflective element driving module 8-201, and the incident light is finally received at the optical element 8-320.

The top case 8-210 has a hollow structure, and can be combined with the base 8-220 to form a housing 8-F of the reflective element driving module 8-201, wherein the top case 8-210 constitutes a top wall 8-210A and four sidewalls 8-210B of the housing 8-F, and the base 8-220 constitutes a bottom wall 8-220A of the housing 8-F. It should be understood that the top case 8-210 and the base 8-220 are formed with a top case opening 8-212 and a base opening 8-222, respectively. The center of the top case opening 8-212 corresponds to the optical axis 8-O, and the base opening 8-222 corresponds to an image-sensing element (not shown in the figures) disposed outside the reflective element driving module 8-201. External light may enter the top case 8-210 through the top case opening 8-212, and is received by the image-sensing element (not shown in the figures) after passing through the optical element 8-320 and the base opening 8-222, so as to generate a digital image signal.

The frame 8-230 has an opening 8-232 and four frame edges 8-230A, wherein the frame edges 8-230A correspond to the four sidewalls 8-210B of the housing 8-F respectively. The shape of the magnets 8-240 may be a long strip, and the four magnets 8-240 may be fixed to the four frame edges 8-230A. In some embodiments, the magnets 8-240 may have other different shapes, and the four magnets 8-240 may be fixed to four corners of the frame 8-230.

The holder 8-250 has a hollow structure and has a through hole 8-252. The coil 8-260 is wound around the outer peripheral surface of the holder 8-250. In this embodiment, the holder 8-250 is movably disposed in the frame 8-230. More specifically, the holder 8-250 can be suspended in the center of the frame 8-230 by an elastic element 8-270 made of metal. When a current is applied to the coil 8-260, the coil 8-260 can act with the magnetic field of the magnets 8-240 to generate an electromagnetic force to drive the holder 8-250 to move along a Z axis with respect to the frame 8-230.

It should be understood that the outer peripheral portion of the elastic element 8-270 is connected to the frame 8-230, and the inner peripheral portion of the elastic element 8-270 is connected to the holder 8-250, so that the holder 8-250 can be suspended in the frame 8-230.

One end of the four suspension wires 8-274 is connected to the circuit board 8-290, and the other end is connected to the elastic element 8-270, so that the suspension wires 8-274 can suspend the frame 8-230 and the holder 8-250 in the housing 8-F. The suspension wires 8-274 may comprise a metal material.

The driving board 8-280, e.g., a printed circuit board, has four driving coils (not shown) therein. The positions of the four driving coils respectively correspond to the positions of the four magnets 8-240. The driving board 8-280 may be affixed to the circuit board 8-290 by adhesion.

It should be understood that the circuit board 8-290 is provided with wiring for transmitting electric signals to the coils 8-260 and the driving coils of the driving board 8-280, and the wiring on the circuit board 8-290 may be electrically connected to the coil 8-260 through the suspension wires 8-274 and the elastic elements 8-270, thereby controlling the movement of the holder 8-250 along a direction parallel to the optical axis 8-O. In this embodiment, the circuit board 8-290 is embedded in the base 8-220.

In this embodiment, a first magnetic field sensing element 8-292 and a second magnetic field sensing element 8-294, which are electrically connected to the circuit board 8-290, are respectively installed on different sides of the base 8-220. The two magnetic field sensing elements 8-292 and 8-294 may be Hall effect sensor, magnetoresistive sensor (MR sensor), or magnetic flux sensor (Fluxgate), etc., which can be used to know the position offset of the frame 8-230 and the holder 8-250 with respect to the base 8-220 in the X direction and the Y direction by detecting the magnetic field variation of the magnets 8-240 on the frame 8-230. In addition, in this embodiment, a third magnetic field sensing element 8-296 is disposed on the holder 8-250 and a sensing magnet 8-298 is disposed on the frame 8-230 to detect a position offset in the Z direction.

It should be noted in particular that the circuit board 8-290 can generate and provide electrical signals to the driving coils of the driving board 8-280, and the driving coils can act with the magnets 8-240 on the frame 8-230 to generate an electromagnetic force to move the frame 8-230 along a direction perpendicular to the optical axis 8-O (parallel to the XY plane) to compensate for the position offset described above. As a result, the optical image stabilization (OIS) function is achieved.

Figure 3:
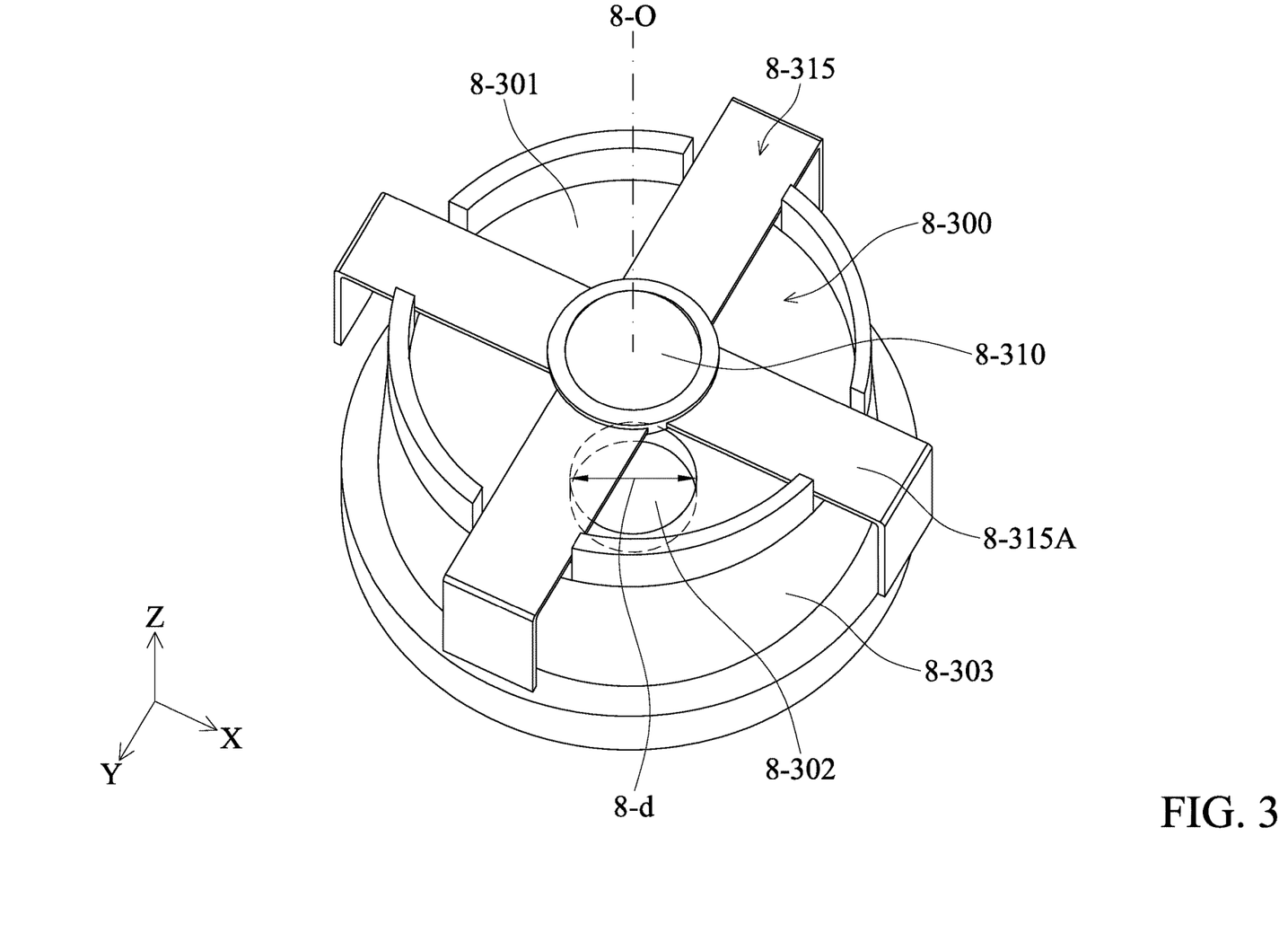
FIG. 3 shows a schematic view of a first reflective element and a second reflective element in accordance with an embodiment of this disclosure.

Refer to FIG. 3. FIG. 3 shows a schematic view of a first reflective element 8-300 and a second reflective element 8-310 in accordance with an embodiment of this disclosure. The first reflective element 8-300 is disposed to correspond to the incident light, and the light has an optical axis 8-O. The second reflective element 8-310 is disposed to correspond to the light reflected by the first reflective element 8-300, and is movable relative to the first reflective element 8-300. The first reflective element 8-300 has a first reflective surface 8-301, a perforation 8-302, and a first reflective element sidewall 8-303. The perforation has a diameter 8-$d$. When viewed along a direction parallel to the optical axis 8-O, the perforation 8-302 partially overlaps the second reflective element 8-310, and the perforation 8-302 is surrounded by the first reflective surface 8-301. The first reflective element sidewall 8-303 is disposed around the first reflective surface 8-301, and extends along a direction parallel to the optical axis 8-O to block unwanted lights. In other words, it can effectively avoid interference of lights that are non-parallel to the optical axis 8-O by setting the first reflective element sidewall 8-303. In this embodiment, the material of the first reflective surface 8-301 is glass, and the material of the first reflective element sidewall 8-303 is plastic, but the materials of the first reflective surface 8-301 and the first reflective element sidewall 8-303 are not limited to this, and may be changed as required. For example, the material of the first reflective surface 8-301 may also be stainless steel, polycarbonate, or acrylic. Furthermore, the first reflective surface 8-301 may be plated by a metal film.

Figure 4:
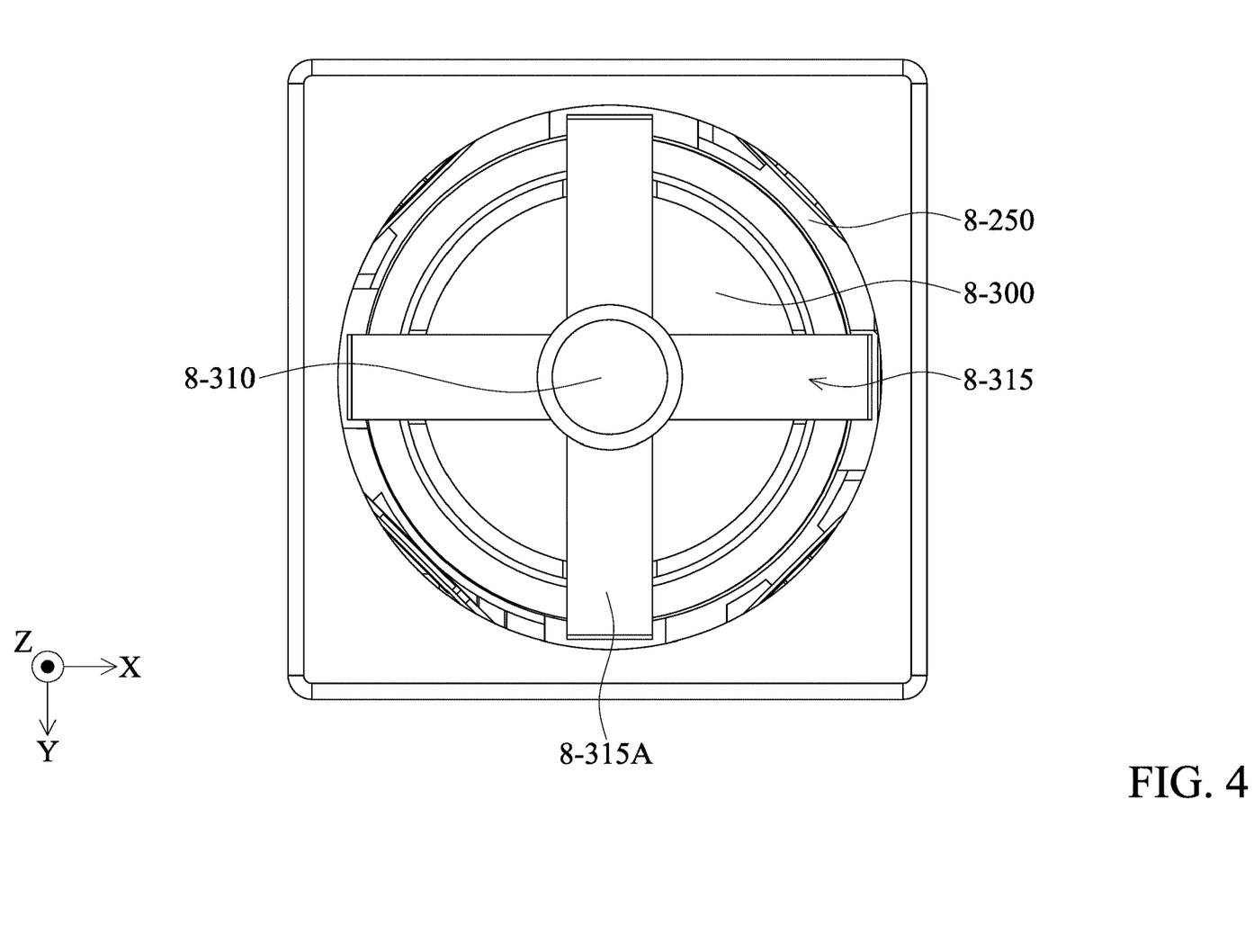
FIG. 4 shows a top view of a reflective element driving module in accordance with an embodiment of this disclosure.

Refer to FIG. 4. FIG. 4 shows a top view of a reflective element driving module 8-201 according to an embodiment of this disclosure. The first reflective element 8-300 and the second reflective element 8-310 are arranged along a direction parallel to the optical axis 8-O, and the first reflective element 8-300 is closer to the base 8-220 than the second reflective element 8-310 (refer to FIG. 5). The second reflective element 8-310 has a transparent material which can allow the light to partially pass through. The second reflective element 8-310 includes a second reflective surface 8-311 and a recess 8-312 (refer to FIG. 5). The bracket 8-315 has a light-transmissive material which can allow the light partially pass through. The bracket 8-315 is configured to connect the holder 8-250 and the second reflective element 8-310. In this embodiment, the bracket 8-315 has a plurality of cantilever 8-315A, one end of the cantilevers 8-315A is connected to the recess 8-312 of the second reflective element 8-310, and the other end of the cantilevers 8-315A is fixed to the holder 8-250 by insert molding. The material of the cantilevers 8-315A is metal to stably support the second reflective element 8-310. When viewed along a direction parallel to the optical axis 8-O, the bracket 8-315 partially overlaps the first reflective element 8-300, and the cantilevers 8-315A are point-symmetrical with the optical axis 8-0 as the center. In this embodiment, the width of the cantilevers 8-315A is about 2 millimeters, but it is not limited to this, and can be adjusted as required.

Figure 5:
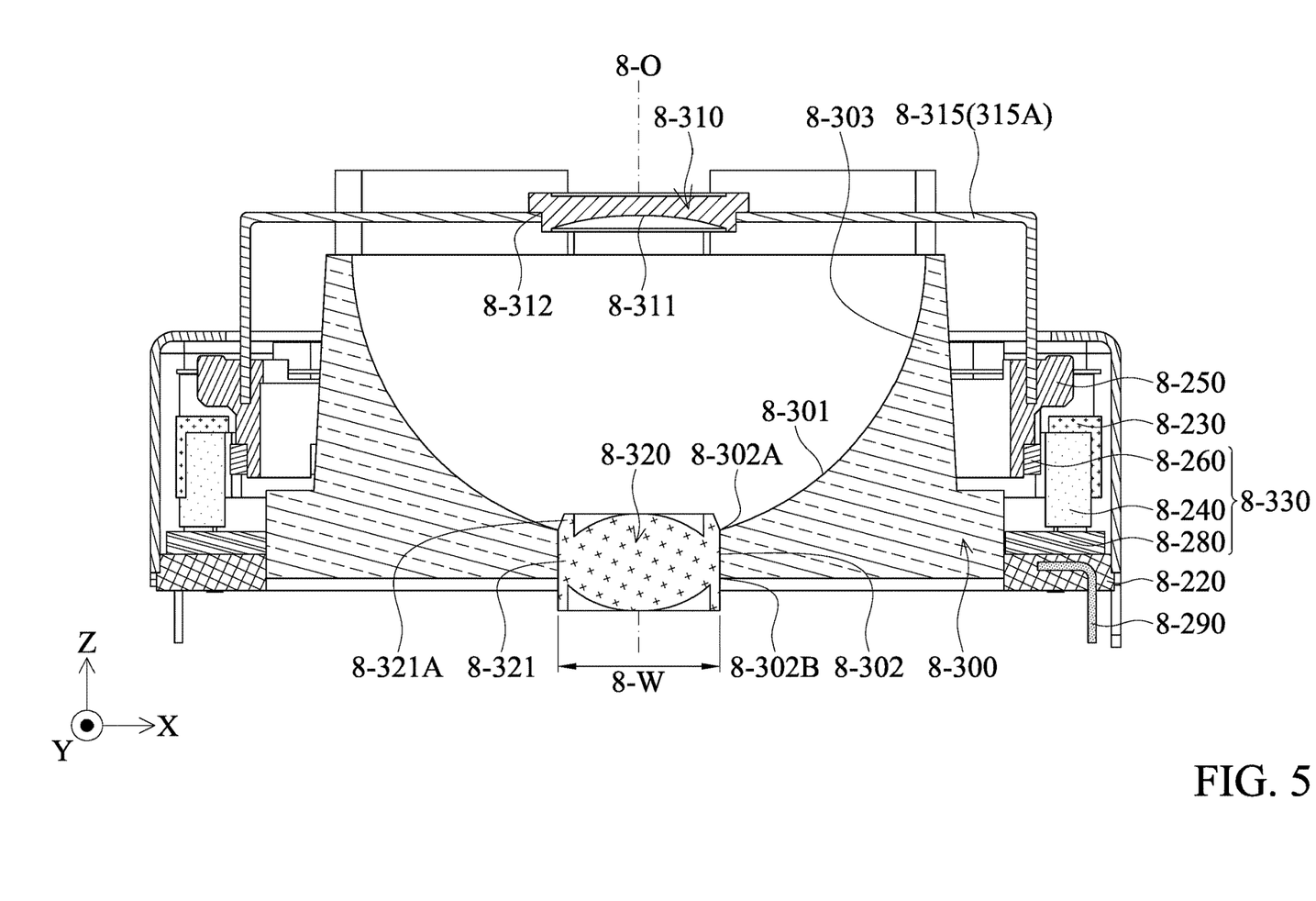
FIG. 5 shows a cross-sectional view of a reflective element driving module along a line 8-A-8-A' in FIG. 1.

Refer to FIG. 5. FIG. 5 shows a cross-sectional view of the reflective element driving module 8-201 along a line 8-A-8-A' in FIG. 1. The optical element 8-320 is disposed in the perforation 8-302 of the first reflective element 8-300 to correspond to the light reflected by the second reflective element 8-310. The diameter 8-*d* of the perforation 8-302 (as shown in FIG. 3) is larger than a width 8-*w* of the optical element 8-320. When viewed along a direction perpendicular to the optical axis 8-O, the optical element 8-320 partially protrudes from the upper side 8-302A and the lower side 8-302B of the perforation 8-302. In addition, when viewed along a direction perpendicular to the optical axis 8-O, the first reflective element 8-300 and the optical element 8-320 at least partially overlap. The optical element 8-320 has an optical element sidewall 8-321, and the optical element sidewall 8-321 has a reduction portion 8-321A in a direction toward the second reflective element 8-310, so that the light is blocked less during reflection. For example, if the optical element 8-320 does not have the reduction portion 8-321A, after the light is incident on the first reflective element 8-300, a portion of the light blocked by the optical element sidewall 8-321 cannot be reflected directly to the second reflective element 8-310, and thus the amount of light received by the optical element 8-320 is reduced. Therefore, in this embodiment, the probability of blocking the reflected light is reduced by reducing the optical element sidewall 8-321 to form the reduction portion 8-321A.

Figure 6:
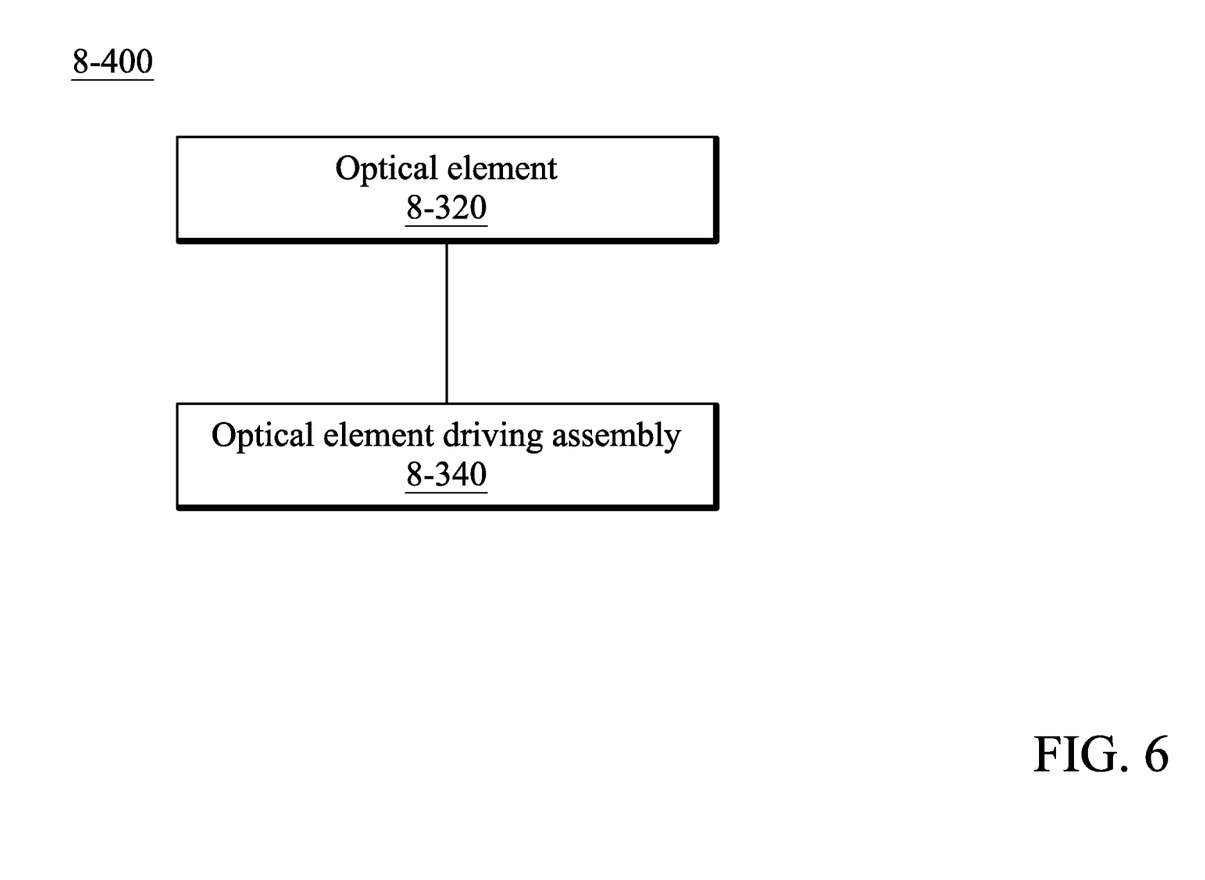
FIG. 6 shows a block diagram of a reflective element driving module in accordance with an embodiment of this disclosure.

In addition, in this embodiment, the optical element 8-320 is fixed to the first reflective element 8-300 and cannot be moved, but it is not limited to this. The optical element 8-320 may also be moved relative to the first reflective element 8-300, and further strengthen an application of a focus function of the optical element. For example, as shown in the block diagram of the optical element driving module 8-400 according to an embodiment of this disclosure in FIG. 6, an optical element driving assembly 8-340 may be added to form an optical element driving module 8-400 with the optical element 8-320. The optical element driving assembly 8-340 is used for driving the optical element 8-320 to move relative to the first reflective element 8-300.

Referring to FIG. 5, the first reflective surface 8-301 of the first reflective element 8-300 and the second reflective surface 8-311 of the second reflective element 8-310 face different directions. When viewed along a direction parallel to the optical axis 8-O, the first reflective surface 8-301 of the first reflective element 8-300 partially overlaps the second reflective surface 8-311 of the second reflective element 8-310. Therefore, when the light parallel to the optical axis 8-O enters the first reflective surface 8-301 of the first reflective element 8-300 from the outside, the first reflective element 8-300 focuses and reflects the light to the focus, that is, the position of the second reflective element 8-310. Then, the second reflective surface 8-311 of the second reflective element 8-310 reflects the light to the optical element 8-320 for further imaging. In the conventional lens module, in order to achieve a long focal length, the lens module must be lengthened. However, a longer focal length can be obtained with a shorter lens module by using the optical path design of this embodiment.

In this embodiment, the magnet 8-240, the coil 8-260, and the driving board 8-280 constitute a driving assembly 8-330, which can be used to drive the second reflective element 8-310 to move relative to the first reflective element 8-300. When viewed along a direction perpendicular to the optical axis 8-O, the optical element 8-320 and the driving assembly 8-330 at least partially overlap. The composition of the driving assembly 8-330 is not limited to this, and coils, magnets, and a driving board or other elements may be added or removed as required. As described above, since the holder 8-250 is movably disposed in the frame 8-230, and the bracket 8-315 connected to the second reflective element 8-310 is disposed on the holder 8-250. Therefore, when focusing is performed, the position in the Z axis direction can be determined by the third sensing element 8-296 and the sensing magnet 8-298 disposed on the frame, and the electric signals are transmitted through the circuit board 8-290 so that the current is applied to the coil 8-260 on the holder 8-250, and then the coil 8-260 acts with the magnetic field of the magnet 8-240 to generate an electromagnetic driving force to drive the holder 8-250 and the second reflective element 8-310 to move in the Z axis direction relative to the first reflective element 8-300. That is, the driving assembly 8-330 can drive the second reflective element 8-310 to move along a direction perpendicular to the optical axis 8-O to achieve the focusing.

If the second reflective element 8-310 is out of focus, the first magnetic field sensing element 8-292 and the second magnetic field sensing element 8-294 can be used to know the position offset of the frame 8-230 and the holder 8-250 with respect to the base 8-220 in the X direction and the Y direction by detecting the magnetic field variation of the magnets 8-240 on the frame 8-230, and the circuit board 8-290 transmits the electric signals to the driving coils (not shown) in the driving board 8-280, and the driving coils act with the magnet 8-240 on the frame 8-230 to generate the electromagnetic driving force to drive the frame 8-230 to move along a direction perpendicular to the optical axis 8-O, that is, the driving assembly 8-330 can drive the second reflective element 8-310 to move along a direction parallel to the optical axis 8-O to compensate for the position offset in the X direction and the Y direction described above.

With the embodiment disclosed by the present invention, the light amount is larger than that of the conventional lens module, and the optical path does not need to be extended as the conventional lens module to achieve the same effect, which greatly reduces the size of the lens module and can achieve miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A reflective element driving module, comprising:
    a first reflective element, having a first reflective surface, disposed to correspond to an incident light, wherein the light has an optical axis;
    a second reflective element, having a second reflective surface, disposed to correspond to the light reflected by the first reflective element, wherein the second reflective element is movable relative to the first reflective element; and
    a driving assembly, configured to drive the second reflective element to move relative to the first reflective element;
    wherein the first reflective surface and the second reflective surface face different directions.

2. The reflective element driving module as claimed in claim 1, wherein the first reflective element has a perforation, and when viewed in a direction parallel to the optical axis, the perforation partially overlaps the second reflective element, and the perforation is surrounded by the first reflective surface.

3. The reflective element driving module as claimed in claim 2, further comprising an optical element disposed in the perforation to correspond to the light reflected by the second reflective element.

4. The reflective element driving module as claimed in claim 3, wherein a diameter of the perforation is greater than a width of the optical element.

5. The reflective element driving module as claimed in claim 3, wherein when viewed in a direction perpendicular to the optical axis, the optical element partially protrudes from the perforation.

6. The reflective element driving module as claimed in claim 3, wherein the optical element has an optical element sidewall, and the optical element sidewall has a reduction portion in a direction toward the second reflective element.

7. The reflective element driving module as claimed in claim 3, wherein when viewed in a direction perpendicular to the optical axis, the first reflective element and the optical element at least partially overlap.

8. The reflective element driving module as claimed in claim 3, wherein when viewed in a direction perpendicular to the optical axis, the optical element and the driving assembly at least partially overlap.

9. The reflective element driving module as claimed in claim 3, further comprising an optical element driving assembly, driving the optical element to move relative to the first reflective element.

10. The reflective element driving module as claimed in claim 1, wherein the first reflective element has a first reflective element sidewall disposed around the first reflective surface, and the first reflective element sidewall extends along a direction parallel to the optical axis.

11. The reflective element driving module as claimed in claim 1, wherein the first reflective element and the second reflective element are arranged along a direction parallel to the optical axis, and the second reflective element has a transparent material which allows the light to partially pass through.

12. The reflective element driving module as claimed in claim 1, further comprising a holder and a bracket, wherein the bracket is connected to the holder and the second reflective element.

13. The reflective element driving module as claimed in claim 12, wherein when viewed along a direction parallel to the optical axis, the bracket partially overlaps the first reflective element.

14. The reflective element driving module as claimed in claim 12, wherein the bracket has a plurality of cantilevers, when viewed along a direction parallel to the optical axis, the cantilevers are point-symmetric with the optical axis as a center.

15. The reflective element driving module as claimed in claim 12, wherein the bracket has a light-transmissive material.

16. The reflective element driving module as claimed in claim 1, wherein when viewed along a direction parallel to the optical axis, the first reflective surface of the first reflective element partially overlaps the second reflective surface of the second reflective element.

17. The reflective element driving module as claimed in claim 1, wherein when viewed along a direction perpendicular to the optical axis, the driving assembly and the first reflective element at least partially overlap.

18. The reflective element driving module as claimed in claim 1, wherein the reflective element driving module has a rectangular structure with a height of less than 10 cm.

19. The reflective element driving module as claimed in claim 1, wherein the driving assembly drives the second reflective element to move in a direction parallel to the optical axis.

20. The reflective element driving module as claimed in claim 1, wherein the driving assembly drives the second reflective element to move in a direction perpendicular to the optical axis.

* * * * *